United States Patent
Gibson et al.

(10) Patent No.: US 10,486,676 B2
(45) Date of Patent: *Nov. 26, 2019

(54) METHODS AND SYSTEMS FOR ASSISTED DIRECT START CONTROL

(71) Applicant: Ford Global Technologies, LLC, Dearborn, MI (US)

(72) Inventors: Alex O'Connor Gibson, Ann Arbor, MI (US); Roger Lyle Huffmaster, Canton, MI (US); Peter John Grutter, Dearborn, MI (US); Felix Nedorezov, Rochester Hills, MI (US); Rodney Lewis Lopez, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 183 days.

This patent is subject to a terminal disclaimer.

(21) Appl. No.: 15/677,781

(22) Filed: Aug. 15, 2017

(65) Prior Publication Data

US 2017/0341637 A1     Nov. 30, 2017

Related U.S. Application Data

(63) Continuation of application No. 12/348,198, filed on Jan. 2, 2009, now Pat. No. 9,764,726.

(51) Int. Cl.
*B60W 10/02* (2006.01)
*B60W 10/06* (2006.01)
*F16H 61/00* (2006.01)

(52) U.S. Cl.
CPC .......... *B60W 10/06* (2013.01); *B60W 10/026* (2013.01); *B60W 2510/0638* (2013.01); *B60W 2510/0685* (2013.01); *F16H 61/0059* (2013.01)

(58) Field of Classification Search
None
See application file for complete search history.

(56) References Cited

U.S. PATENT DOCUMENTS

| | | |
|---|---|---|
| 5,004,084 A | 4/1991 | Mehr-Ayin et al. |
| 6,054,844 A | 4/2000 | Frank |
| 6,055,475 A | 4/2000 | Moriyama |
| 6,258,008 B1 | 7/2001 | Tabata et al. |
| 6,275,759 B1 | 8/2001 | Nakajima et al. |
| 6,371,883 B1 | 4/2002 | Eguchi |
| 6,390,947 B1 | 5/2002 | Aoki et al. |
| 6,546,826 B2 | 4/2003 | Suzuki |
| 6,556,910 B2 | 4/2003 | Suzuki et al. |
| 6,648,795 B2 | 11/2003 | Kobayashi |
| 6,730,000 B1 | 5/2004 | Leising et al. |

(Continued)

FOREIGN PATENT DOCUMENTS

| | | |
|---|---|---|
| DE | 102006018960 A1 | 10/2007 |
| EP | 1367246 A1 | 12/2003 |

*Primary Examiner* — Justin Holmes
(74) *Attorney, Agent, or Firm* — Geoffrey Brumbaugh; McCoy Russell LLP

(57) ABSTRACT

Methods and systems are provided for controlling a vehicle system including an engine that is selectively shut-down during engine idle-stop conditions, the vehicle system further including a hydraulically actuated transmission component. One example method comprises, during an idle-stop engine shut-down, adjusting a hydraulic actuation of the transmission component to adjust drag torque on the engine to stop the engine.

15 Claims, 7 Drawing Sheets

(56) References Cited

U.S. PATENT DOCUMENTS

| | | |
|---|---|---|
| 6,881,171 B2 | 4/2005 | Kuhstrebe et al. |
| 6,926,639 B2 | 8/2005 | Hopper |
| 7,025,706 B2 | 4/2006 | Katou |
| 7,040,304 B2 | 5/2006 | Kassner |
| 7,130,731 B2 | 10/2006 | Itoh et al. |
| 7,146,960 B2 | 12/2006 | Phlips et al. |
| 7,191,756 B2 | 3/2007 | Phlips et al. |
| 7,449,793 B2 | 11/2008 | Cho et al. |
| 7,610,143 B1 | 10/2009 | Boesch |
| 9,764,726 B2 * | 9/2017 | Gibson ............... B60W 10/026 |
| 2002/0046732 A1 | 4/2002 | Katou |
| 2002/0179047 A1 | 12/2002 | Hoang |
| 2003/0022755 A1 | 1/2003 | Mizutani |
| 2003/0171868 A1 | 9/2003 | Morishita et al. |
| 2004/0127326 A1 | 7/2004 | Tajima et al. |
| 2005/0014604 A1 | 1/2005 | Sakakibara et al. |
| 2005/0080523 A1 | 4/2005 | Bennett et al. |
| 2005/0279543 A1 | 12/2005 | Seufert et al. |
| 2006/0137920 A1 | 6/2006 | Aoki et al. |
| 2006/0157023 A1 | 7/2006 | Matsuki et al. |
| 2006/0272869 A1 | 12/2006 | Hidaka et al. |
| 2007/0078040 A1 | 4/2007 | Nobumoto et al. |
| 2008/0029331 A1 | 2/2008 | Schiele |
| 2014/0288807 A1 * | 9/2014 | Tribulowski ........ F02N 11/0818 701/112 |

\* cited by examiner

METHODS AND SYSTEMS FOR ASSISTED DIRECT START CONTROL

CROSS REFERENCE TO RELATED APPLICATION

The present application is a continuation of U.S. patent application Ser. No. 12/348,198, entitled "METHODS AND SYSTEMS FOR ASSISTED DIRECT START CONTROL," filed on Jan. 2, 2009. The entire contents of the above-referenced application are hereby incorporated by reference in its entirety for all purposes.

FIELD

The present application relates to methods and systems for controlling an engine shut-down.

BACKGROUND AND SUMMARY

Vehicles have been developed to perform an idle-stop when idle-stop conditions are met and automatically restart the engine when restart conditions are met. Such idle-stop systems enable fuel savings, reduction in exhaust emissions, reduction in noise, and the like. As such, a number of methods may be used to control the transmission to improve idle-stops and subsequent restarts, when restart conditions are met.

One such example is illustrated by Suzuki et al. in U.S. Pat. No. 6,556,910 B2. Therein, a plurality of transmission forward clutches are controlled by a hydraulic servo to shift the clutches between engaged and disengaged states when adjusting between idle-stop and restart conditions. Specifically, when an idle-stop condition is satisfied, the transmission is maintained in gear and a hydraulic pressure of the hydraulic servo is also maintained at a predetermined pressure.

However, the inventors have recognized several potential issues with such a method. As one example, during idle-stop conditions, the time required to stop the engine, for example the time required to drop the engine speed from 700 RPM to zero, may be longer than desired. As such, if the time needed for engine shut-down is too long, a vehicle operator may choose to restart and/or launch the vehicle before the engine speed has dropped to zero.

Thus in one example, some of the above issues may be addressed by a method of controlling a system including an engine that is selectively shut-down during engine idle-stop conditions, the system further including a hydraulically actuated transmission component. The method may comprise, during an idle-stop engine shut-down, adjusting a hydraulic actuation of the transmission component to adjust a drag torque on the engine to stop the engine.

In one example, the transmission component is a transmission forward clutch. Herein, the drag torque may be increased by increasing the hydraulic pressure supplied to the transmission forward clutch, thereby enabling adjustment of a drag torque to counteract rotation of the engine by the ground through the wheels/powertrain. An electric pump and/or accumulator system may also be used in addition to a transmission mechanical pump to provide sufficient hydraulic line pressure during the engine spin down. By supplementing a transmission mechanical pump with an electric pump, the net pumping capacity and consequently the net hydraulic line pressure supplied may be significantly increased or maintained during the shut-down, thereby enabling the powertrain drag torque to be applied to the engine, thereby providing a faster engine shut-down. In addition to enabling a faster engine shut-down, crankshaft oscillations due to cylinder air-spring effects after the engine speed had reached zero, may be significantly dampened. In an alternate example, the transmission component may be a torque converter lock-up clutch.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
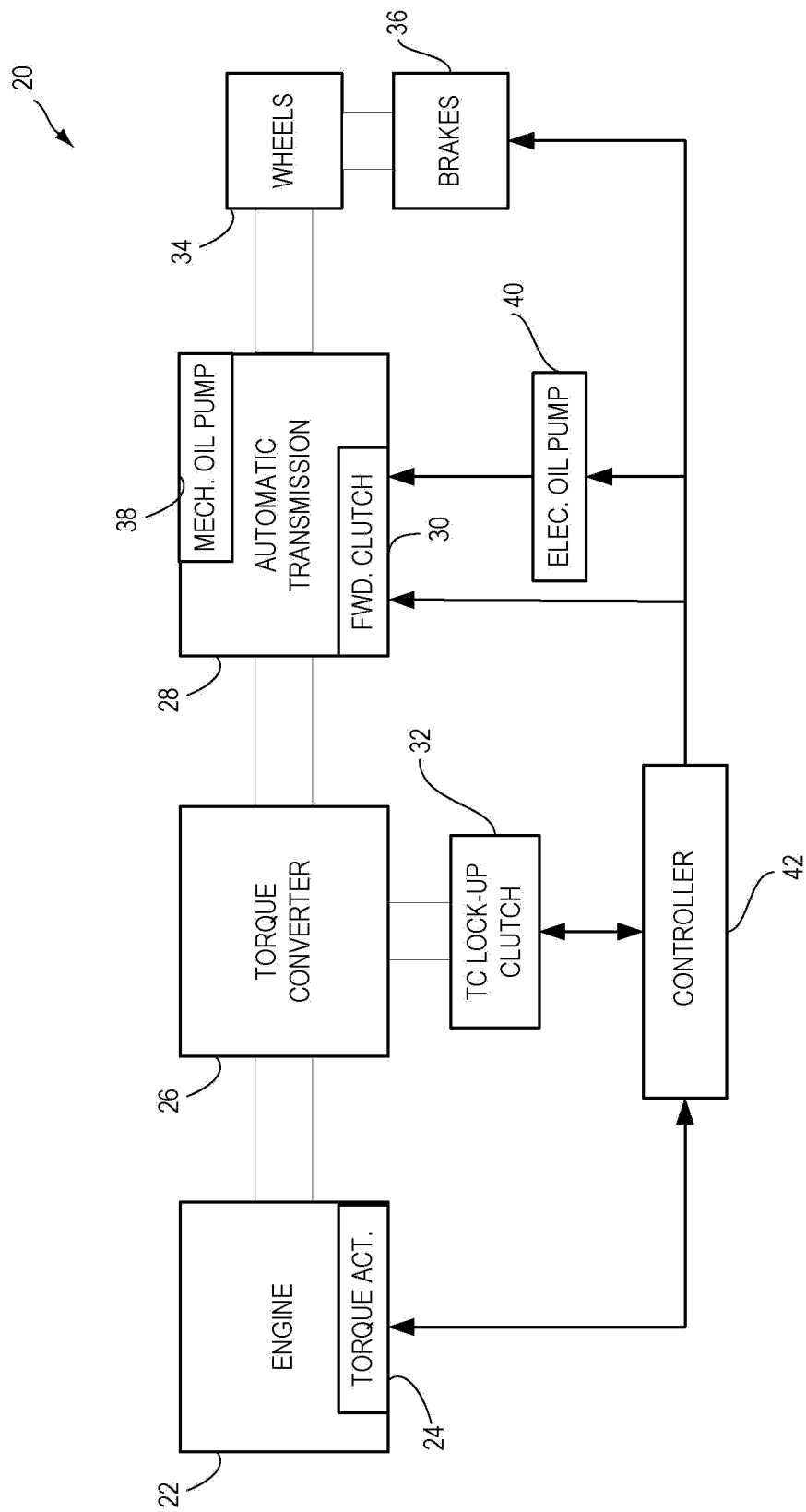
FIG. 1 shows an example vehicle system layout, including details of a vehicle drive-train.
Figure 2:
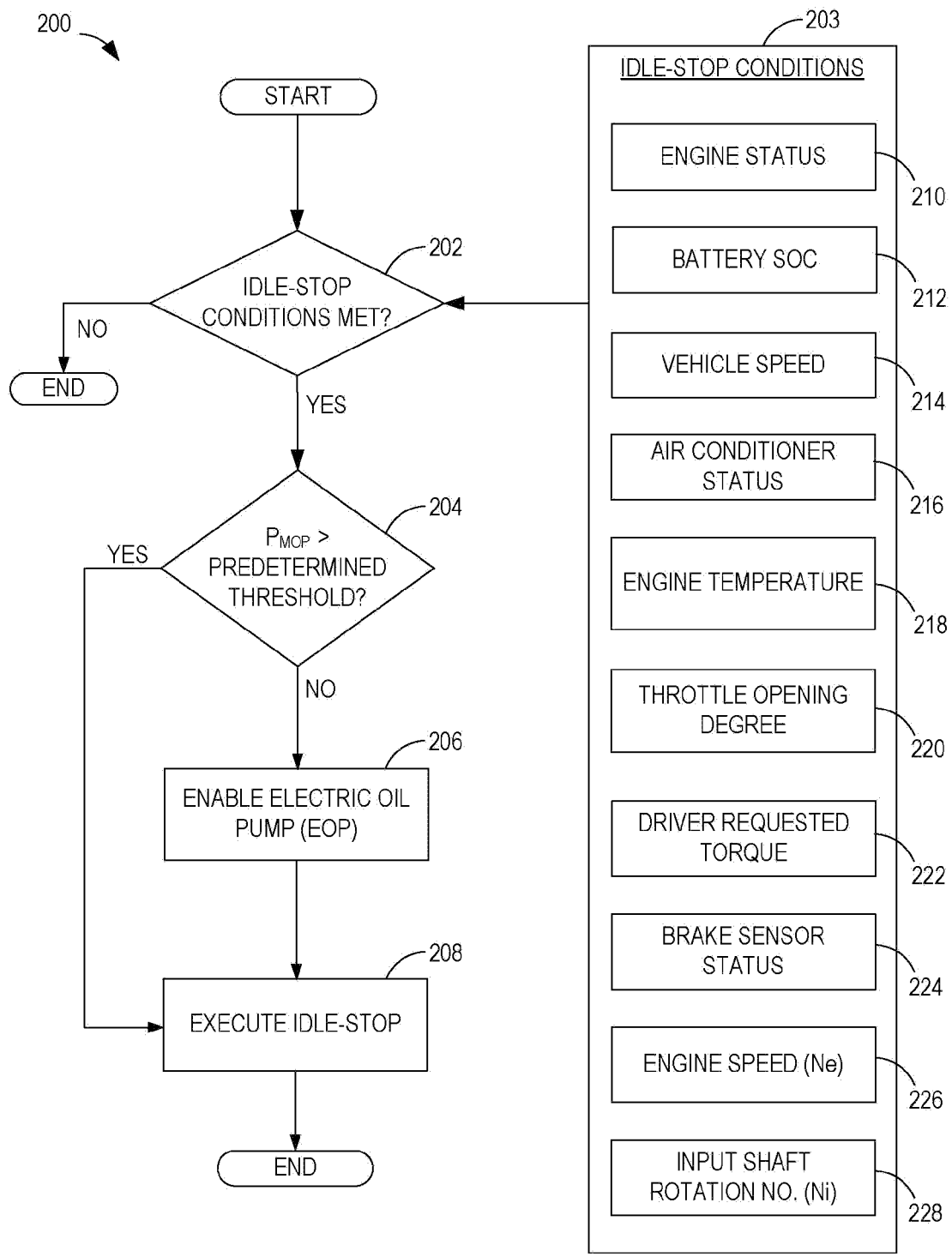
FIG. 2 shows a high level flow chart for executing an idle-stop operation.
Figure 3:
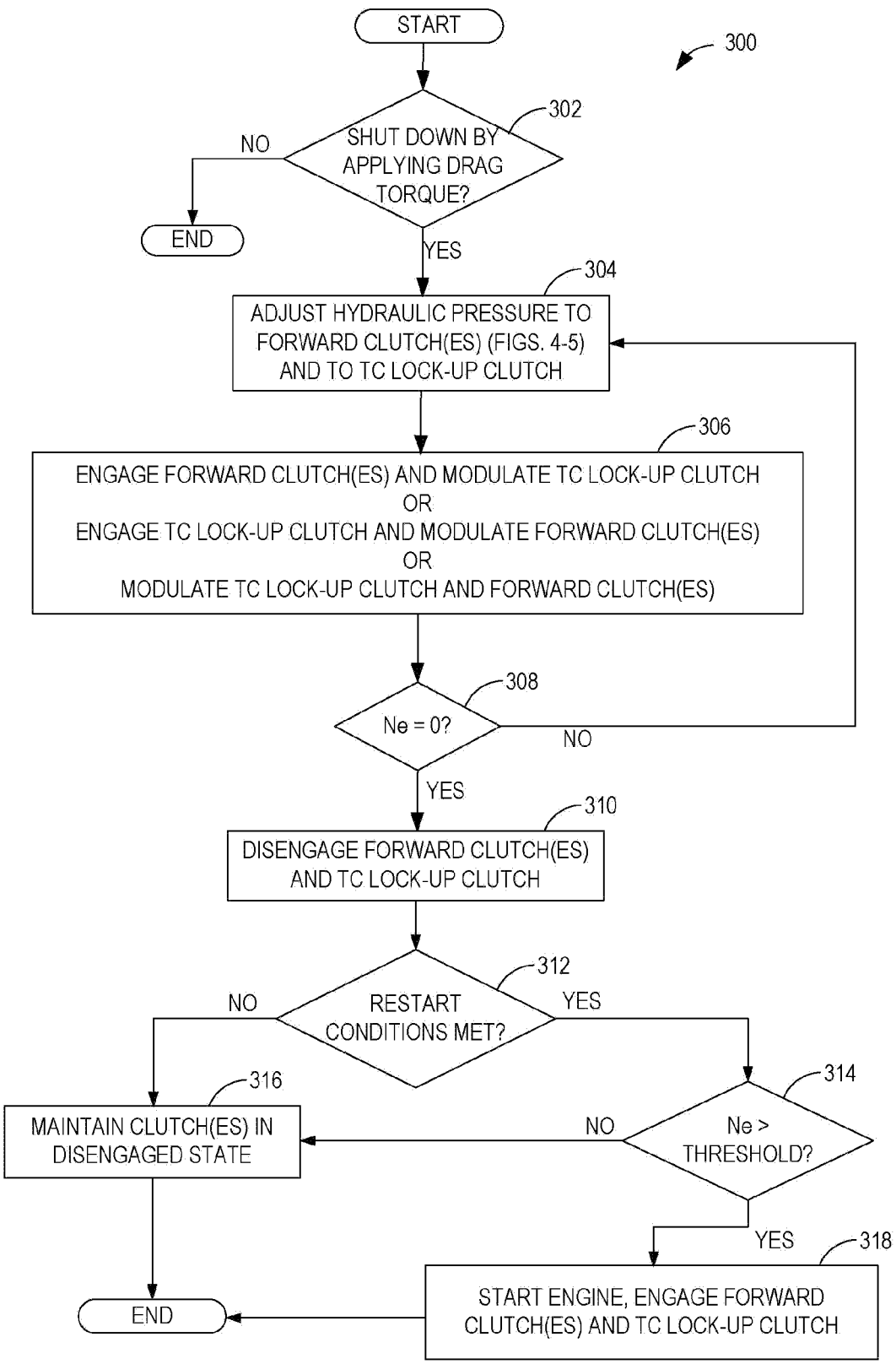
FIG. 3 shows a high level flow chart for executing the idle-stop operation of FIG. 2 by applying a drag torque according to the present disclosure.
Figure 4:
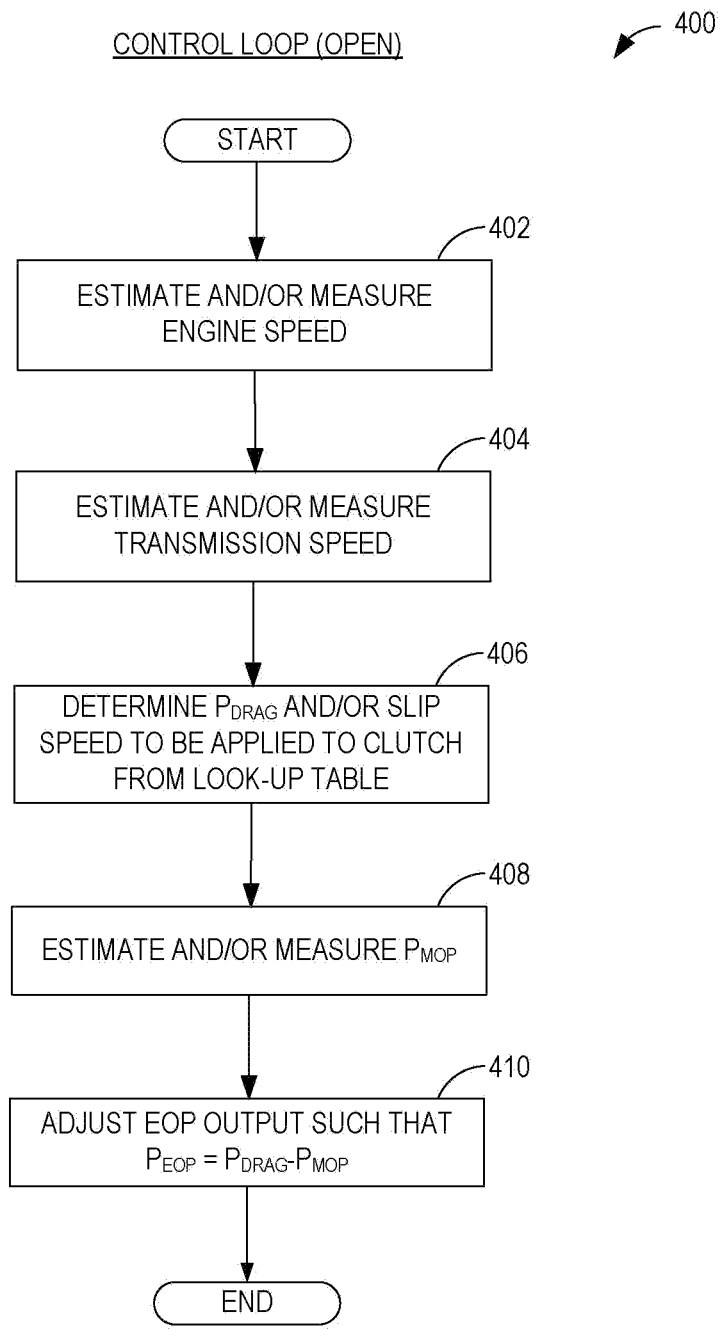
FIG. 4 shows a high level flow chart for adjusting hydraulic pressure to forward clutches using an open control loop.
Figure 5:
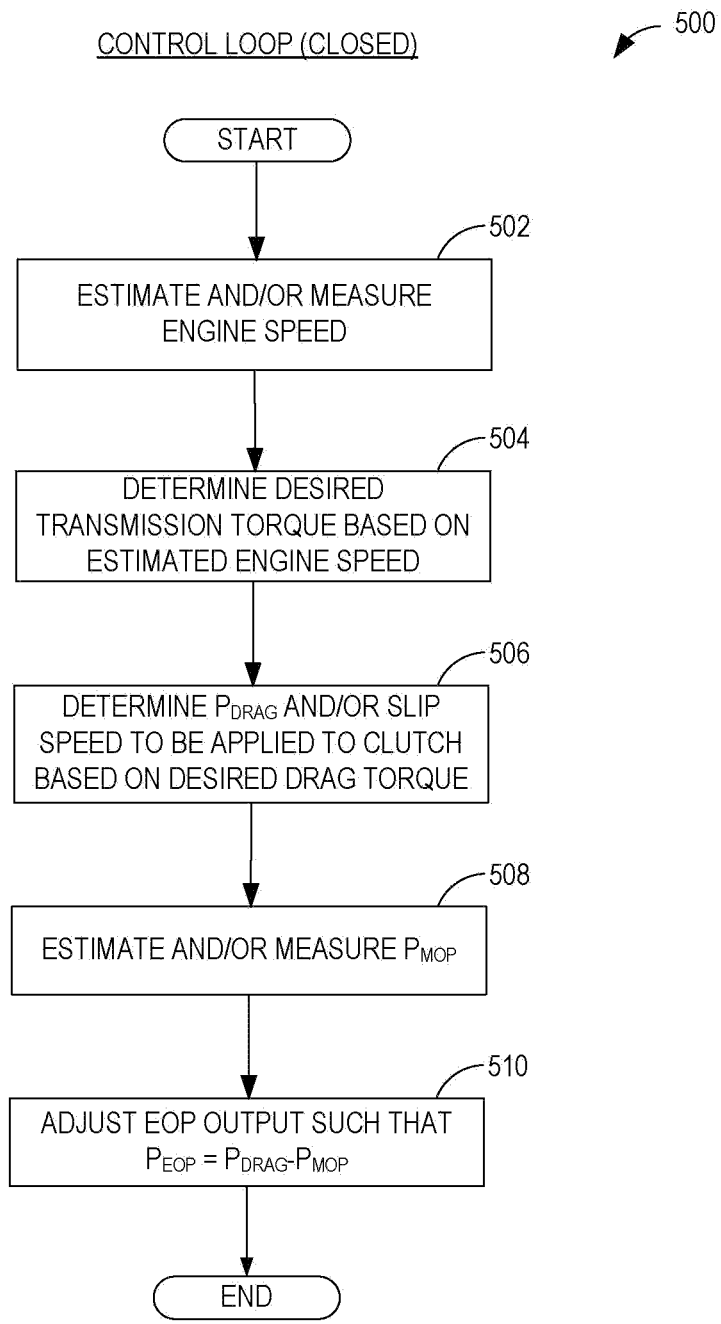
FIG. 5 shows a high level flow chart for adjusting hydraulic pressure to forward clutches using a closed control loop.

The following description relates to systems and methods for expediting engine shut-down, when idle-stop conditions are met, by controlling the output of a vehicle electric oil pump, such as the pump illustrated in FIG. 1. In doing so, the drag torque applied to the engine may be adjusted, for example, increased. As shown in FIGS. 2-3, an engine control system may be configured to supplement the pumping capacity of a transmission mechanical oil pump with that of an electric oil pump to reduce the time for achieving engine shut-down. In this way, the transmission can be used as a drag torque actuator to expedite and/or control the engine shut-down process. The transmission drag torque based engine shut-down may be controlled using an open-loop method (as shown in FIG. 4) via a look-up table of clutch pressure as a function of engine speed. Alternatively, engine shut-down may be controlled using a closed-loop method (as shown in FIG. 5) wherein the clutch pressure is adjusted in feedback response to the engine output. The overall coordination of events during an example engine shut-down is illustrated graphically in FIGS. 6A-B. In this way, by using an electric oil pump assisted drag torque to expedite and/or control engine shut-down, the time required for shutting down an engine once idle-stop conditions are met may be significantly reduced.

FIG. 1 is a block diagram of a vehicle drive-train 20. Drive-train 20 may be powered by engine 22. In one example, engine 22 may be a gasoline engine. In alternate embodiments, other engine configurations may be employed, for example a diesel engine. Engine 22 may be started with an engine starting system (not shown). Further, engine 22 may generate or adjust torque via torque actuator 24, such as a fuel injector, throttle, etc.

Engine 22 may further include an auxiliary starter system (not shown) to support engine restart at near zero engine speed, for example at 50 RPM. In one example, the auxiliary starter system may be used to restart the engine if a driver requests vehicle launch while the engine is being spun down in response to prior fulfillment of idle-stop conditions. Auxiliary starter systems, however, may add significant cost and complexity to the engine system. Thus, in one example, by using a drag torque to expedite engine shut-down, the requirement for such auxiliary starter systems may be reduced. In doing so, the cost and complexity incurred by such starter systems in vehicle drive-train 20 may be averted.

An engine output torque may be transmitted to torque converter 26 to drive an automatic transmission 28 by engaging one or more clutches, including forward clutch 30, where the torque converter may be referred to as a component of the transmission. As such, a plurality of such clutches may be engaged, as needed. The output of the torque converter may in turn be controlled by torque converter lock-up clutch 32. As such, when torque converter lock-up clutch 32 is fully disengaged, torque converter 26 transmits torque to automatic transmission 28 via fluid transfer between the torque converter turbine and torque converter impeller, thereby enabling torque multiplication. In contrast, when torque converter lock-up clutch 32 is fully engaged, the engine output torque is directly transferred via the torque converter clutch to an input shaft (not shown) of transmission 28. Alternatively, the torque converter lock-up clutch 32 may be partially engaged, thereby enabling the amount of torque relayed to the transmission to be adjusted. A controller may be configured to adjust the amount of torque transmitted by the torque converter by adjusting the torque converter lock-up clutch in response to various engine operating conditions, or based on a driver-based engine operation request.

Torque output from the automatic transmission 28 may in turn be relayed to wheels 34 to propel the vehicle. Specifically, automatic transmission 28 may adjust an input driving torque at the input shaft (not shown) responsive to a vehicle traveling condition before transmitting an output driving torque to the wheels.

Further, wheels 34 may be locked by engaging wheel brakes 36. In one example, wheel brakes 36 may be engaged in response to the driver pressing his foot on a brake pedal (not shown). In the same way, wheels 34 may be unlocked by disengaging wheel brakes 36 in response to the driver releasing his foot from the brake pedal.

A mechanical oil pump 38 may be in fluid communication with the automatic transmission 28 to provide hydraulic pressure to engage various clutches, such as a forward clutch 30 and/or the torque converter clutch 32. Mechanical oil pump 38 may be operated in accordance with torque converter 26, and may be driven by the rotation of the engine or transmission input shaft, for example. Thus, the hydraulic pressure generated in mechanical oil pump 38 may increase as an engine speed increases, and may decrease as an engine speed decreases. An electric oil pump 40, also in fluid communication with the automatic transmission but operating independent from the driving force of the engine 22 or transmission 28, may be provided to supplement the hydraulic pressure of the mechanical oil pump 38. Electric oil pump 40 may be driven by a motor (not shown) to which an electric power may be supplied, for example by a battery (not shown).

A controller 42 may be configured to receive inputs from engine 22 and accordingly control a torque output of the engine and/or operation of the torque converter, transmission, and/or brakes. As one example, a torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 42 may control the engine torque output by controlling a combination of fuel pulse width, fuel pulse timing, and air charge. In all cases, engine control may be performed on a cylinder-by-cylinder basis to control the engine torque output.

When idle-stop conditions are satisfied, controller 42 may control operation of the powertrain to control stopping of the engine. In one example, to decrease the duration of the engine spin down, a controllable drag torque may be applied to the engine via transmission and torque converter. For example, a torque converter can be used to transmit a drag torque generated by the stopped vehicle wheels through the gears of the transmission via the transmission forward clutch. In other words, an in-gear transmission may be used to apply a braking drag torque on the engine, wherein the amount of torque applied can be modulated via slipping of a transmission clutch, such as the forward clutch and/or torque converter clutch. In another example, a larger drag torque can be generated by increasing engagement of at least one (or both) of the torque converter clutch and the transmission forward clutch. For example, if the transmission forward clutch and torque converter clutch were fully engaged, and the wheels were held fixed to the ground via friction and/or the wheel brakes, then a maximum drag torque can be applied to the engine (assuming the wheels do not break free from the ground). Similarly, the drag torque can be reduced by increasing the slip of at least one or both of the torque converter clutch and transmission forward clutch.

Thus, in one example, the control system maintains forward clutch 30 in an engaged state, at least during engine spin down, and may start to engage torque converter lock-up clutch 32 (if it is not already engaged) to thereby allow an increased external frictional (drag) torque to be applied. In this example, the level of engagement of the torque converter lock-up clutch (that is, whether the clutch is fully engaged, or partially engaged) may be adjusted in response to the speed of the engine to thereby adjust the level of the drag torque responsive to the engine speed and thereby control the spin down of the engine. Alternatively, the controller 42 may maintain the engagement state of the torque converter lock-up clutch at a fixed value and modulate the engagement state of the automatic transmission forward clutch 30 by adjusting the hydraulic pressure supplied to the forward clutch. Alternatively still, controller 42 may modulate the engagement state of both the torque converter lock-up clutch as well as the forward clutch to thereby adjust the drag torque applied to reduce the engine speed to zero. Controller 42 may select between the possible alternatives based on engine operating conditions, clutch conditions (for example, the wear and tear level of forward clutch 30 and torque converter lock-up clutch 32), the response time desired for engine shut-down, etc.

The controller 42 may also adjust the pump output capacity of the electric oil pump to supplement the pump output capacity of the mechanical oil pump to provide sufficient hydraulic pressure to modulate the engagement of forward clutch 30 and/or the torque converter lock-up clutch 32. In one example, the electrically actuated hydraulic pump may be actuated responsive to the request for engine shutdown. Additionally, actuation of the electrically actuated hydraulic pump may be performed responsive to the operation of the mechanically actuated hydraulic pump. Since the output of the mechanical pump is largely affected by the speed of the engine, as the engine speed falls below a threshold (such as 400 RPM, for example), the mechanical pump may not be able to provide sufficient pressure to the forward clutch (or clutches). Consequently, sufficient drag torque may not be generated for quickly shutting down the engine. Thus, the actuation of the electrically actuated hydraulic pump may be further adjusted responsive to engine speed. Herein, the pressure provided by the electric pump may be advantageously used to enable the desired drag torque to be applied. By providing sufficient hydraulic pressure and drag torque using a combination of the electric and mechanical oil pumps, the engine may be spun down at a substantially faster rate, thereby minimizing shut-down time.

In this way, the hydraulic actuation of the transmission component adjusts a coupling between the stopped wheels of the vehicle and the engine through the transmission. Further, the transmission-based coupling between the stopped wheels of the vehicle and the engine may be increased to increase the drag torque in response to the engine speed being above a desired engine speed, and similarly, may be decreased to decrease the drag torque in response to the engine speed being below a desired engine speed. In one example, the forward clutch of the transmission may be further engaged to further increase the drag torque during the shut-down, and vice versa. Alternatively, the torque converter lock-up clutch may be further engaged to further increase the drag torque during the shut-down, and vice versa.

It will be appreciated that controller 42 may optionally or additionally use other methods to drive the engine speed to zero. These may include, but may not be limited to, increasing an alternator output, applying an air-conditioner compressor clutch, and/or increasing engine pumping losses by closing the throttle, by using variable valve lift or by using variable valve timing.

The controller may be configured to reduce engagement of the transmission component after completing the shutdown and subsequently cranking the engine to restart the engine with the transmission component in the reduced engagement condition. In one example, once the engine speed has been brought to zero (or a predetermined threshold near zero), the controller may be configured to disengage forward clutch 30 and torque converter lock-up clutch 32 and maintain the clutches in a disengaged state until restart conditions have been satisfied. Once automatic restart conditions are satisfied, controller 42 may start engine 22 and start engaging (or increase engagement of) torque converter lock-up clutch 32 and/or forward clutch 30, while also releasing wheel brakes 36. The vehicle may then be launched responsive to a driver request.

Controller 42 may be further configured to adjust the hydraulic actuation of the transmission component, for e.g., the transmission clutches, responsive to a desired stopping position of the engine such that by the end of the engine shutdown operation, the engine has been brought to the desired stopping position. In one example, the stopping position may be a position that may enable a faster restart during a subsequent restart operation. It will be appreciated that during the engine shutdown operation, the forward clutch and/or torque converter clutches may not be fully disengaged. For example, the controller may keep one or both of them partially engaged. In other words, a transmission gear may be engaged during the engine shutdown (e.g., during the adjustment of the torque converter clutch, forward clutch, or other hydraulic component, to control the spin-down of the engine from idle speed to substantially zero speed). Similarly, a transmission gear may be engaged (or may remain engaged) during a subsequent engine restart. That is, neither operation may be performed with the transmission in a neutral condition.

Now turning to FIG. 2, a routine 200 is described for performing an idle-stop operation in the vehicle system of FIG. 1. At 202, it is confirmed if idle-stop conditions 203 have been met. Any or all of the idle-stop conditions 203, as further described herein, may be met for an idle-stop condition to be confirmed. For example, at 210, the engine status may be determined. Herein it may be verified that the engine is operating (e.g., carrying out combustion). At 212, the battery state of charge may be determined. In one example, if the battery state of charge is more than 30%, it may be determined that an engine idle-stop may proceed and that recharge may not be required. At 214, it may be verified that the vehicle running speed is within a desired range. In one example, the desired range may be no more than 30 mph. At 216, an air-conditioner status may be assessed and it may be verified that the air conditioner did not issue a request for restarting the engine, as may be requested if air conditioning is desired. At 218, the engine temperature may be estimated and/or measured to determine if it is within a selected temperature range. In one example, the engine temperature may be inferred from an engine coolant temperature and an engine idle-stop condition may be selected when the engine coolant temperature is above a predetermined threshold. At 220, a throttle opening degree may be determined using a throttle opening degree sensor. In one example, the sensor reading may be used to verify that a start has not been requested by the vehicle driver. At 222, the driver requested torque may be estimated to confirm that it is less than a predetermined threshold value. At 224, a brake sensor status may be read. In one example, the brake sensor may read the status of the brake pedal and verify that the brake pedal has been pressed. At 226, the engine speed may be determined. At 228, the input shaft rotation number (Ni) may be determined.

If idle-stop conditions are not met, the routine may end. However, if any or all of the idle-stop conditions are met, then at 204, it is determined if the hydraulic pressure of the mechanical oil pump is greater than a predetermined threshold value. If the pressure is not above the threshold value, then at 206, the electric oil pump may be enabled. Once the electric oil pump has been enabled, at 208, an idle-stop operation may be executed.

As previously mentioned, the controller may select one, or a combination, of methods to drive the engine speed to zero. These may range from increasing an external friction torque to increasing engine internal pumping losses. As one example of using an external friction torque for shutting down the engine, the controller may decide to apply a drag torque, as further elaborated with reference to FIG. 3.

FIG. 3 describes a routine 300 that may be used to shut-down the engine by applying an external friction torque. At 302, it may be determined if the engine is to be shut-down by applying a drag torque, such as during an idle stop as described herein. If not, for example if the engine is to be shut-down by increasing internal pumping losses, the routine may end. If a drag torque method is selected, at 304, the hydraulic pressure to the forward clutch (or clutches) may be adjusted, as further elaborated herein with reference to FIGS. 4-5. Furthermore, the hydraulic pressure to the torque converter lock-up clutch may also be adjusted. The hydraulic pressures may be adjusted such that the clutches may be engaged quickly in response to a controller demand for clutch engagement. At 306, the controller may opt for a fixed engagement of the forward clutch and a modulated engagement of the torque converter lock-up clutch to thereby apply and adjust a transmission drag torque on the engine. Alternatively, the controller may opt for a fixed engagement of the torque converter lock-up clutch and a modulated engagement of the forward clutch. Further still, the controller may opt for a modulated engagement of both the forward clutch and the torque converter lock-up clutch. As such, when a modulated engagement is selected, the controller may adjust a level of partial engagement to full engagement of the clutch responsive to an engine operating parameter, such as engine speed for example. In one example, the engagement state of the clutch may be modulated responsive to the engine speed. As one example, the controller may monitor the engine speed and follow an engine speed profile towards zero speed. When the engine speed profile is above a predetermined threshold, the controller may increase the hydraulic pressure supplied to the clutch to thereby further engage the clutch. Similarly, when the engine speed profile is below a predetermined threshold, the controller may decrease the hydraulic pressure supplied to the clutch to thereby further disengage the clutch.

The controller may select between various clutch engagement options based on a range of engine operating conditions. In one example, if the temperature of the forward clutch is above a predetermined threshold, the controller may maintain the forward clutch in a fixed state of engagement and modulate the engagement state of the torque converter lock-up clutch. In another example, if the torque converter lock-up clutch has shown indications of wear and tear, the controller may maintain the torque converter lock-up clutch in a fixed state of engagement and modulate the engagement state of the forward clutch. In still another example, if a more rapid engine shut-down is desired, the controller may opt to modulate the engagement state of both forward and torque converter lock-up clutches. As such, when adjusting the engagement state of each clutch, the controller may adjust the hydraulic pressure supplied to the respective clutch.

At 308, it may be determined whether the engine speed ($N_e$) has come down to zero. In alternate embodiments, it may be determined whether the engine speed has come down to a near-zero predetermined threshold, such as for example 50 RPM. If the engine speed has not come down, then the routine may return to 304 to adjust the hydraulic pressure in order to appropriately engage the clutches. However, if at 308 the engine speed has come down, then at 310, the forward and torque converter lock-up clutches may be disengaged, indicating the accomplishment of an idle-stop. The clutches may then be maintained in a disengaged state until restart conditions have been met.

At 312, the controller may then proceed to monitor the engine to determine whether restart conditions have been met. The engine restart conditions may include, but not be limited to, the engine being in idle-stop, the driver requested torque being greater than a threshold, a request for restart by the air-conditioner due to a desire for air-conditioning, a battery state of charge below threshold, an emission control device temperature below threshold, the release of a brake pedal, an electrical load greater than threshold. If any of the restart conditions have been met, then at 314, it may be determined whether the engine speed ($N_e$) is above a predetermined minimum threshold. If restart conditions are not met at 312 or if engine speed is not above a predetermined threshold at 314, then a restart may not occur and, at 316, the clutches may be maintained in a disengaged state. However, if restart conditions are met and engine speed is above the predetermined threshold, then at 318, the engine may be started (and an increase in engine speed may be observed). Additionally, forward and torque converter lock-up clutches may be engaged sequentially or concomitantly. Thereby, en engine restart may be established. Subsequently, the vehicle may be launched responsive to a driver request, for example upon release of a brake pedal by the driver. During the launch, the engine may be cranked and started, and during the cranking and/or starting of the engine, the transmission forward clutch may be engaged to begin launching the vehicle (as the transmission is still in gear), even as the engine speed spins up during the start.

Now, with reference to FIGS. 4-5, various control routines for adjusting the hydraulic pressure supplied to the forward clutches for adjusting and/or modulating the engagement state thereof are described. Specifically, the described routines allow for the adjustment of a hydraulic pressure and/or output capacity of an electric oil pump fluidly coupled to (but independent of) the automatic transmission responsive to an engine speed, and in co-ordination with a mechanical oil pump also fluidly coupled to (but dependent on) the transmission. Specifically, FIG. 4 describes an open feed-forward control routine 400 while FIG. 5 describes a closed feedback loop-based control routine 500.

Now turning to routine 400, at 402, an engine speed is measured and/or estimated. At 404, the transmission speed may be measured and/or estimated. At 406, a drag torque and a hydraulic pressure corresponding to it ($P_{DRAG}$) to be applied to the clutch may be determined. As one example, the controller may be configured to use a look-up table to determine the drag torque to be applied responsive to the engine speed and/or transmission speed. A clutch slip speed may additionally or optionally be determined alongside the drag torque.

At 408, the pumping capacity of the mechanical oil pump ($P_{MOP}$) may be estimated and/or measured. In one example, a pressure sensor coupled to the mechanical oil pump may measure the pressure output of the pump. In another example, the pump pressure may be inferred from the engine speed (since the mechanical pump is coupled to and affected by engine speed).

At 410, the output of the electric pump ($P_{EOP}$) may be adjusted such that $P_{EOP}=P_{DRAG}-P_{MOP}$. In one example, a flow level of the electric pump required to generate the desired pressure output may be calculated (or determined from a look-up table stored in the controller). Based on the desired pressure, and the corresponding need to increase or decrease the flow level of oil from the electric pump, a valve regulating flow through the electric pump may be opened or closed. In another example, the flow level remain fixed and pressure output of the pump may be adjusted by adjusting the power output of the pump, for example, by adjusting the power output of the electric motor driving the electric pump. In this way, the pump output may be adjusted to achieve the desired drag torque that may enable an expedited engine shut-down.

Now turning to routine 500, a feedback loop method is described. Herein, at 502, an engine speed is measured and/or estimated. At 504, a desired transmission drag torque is determined based on the estimated engine speed. At 506, a hydraulic pressure corresponding to the drag torque ($P_{DRAG}$) to be applied to the clutch may be determined. A clutch slip speed may additionally or optionally be determined alongside the drag torque. As one example, the controller may be configured to determine the desired slip speed based on a correlation between slip speed and torque transmission through the clutch.

At 508, the pumping capacity of the mechanical oil pump ($P_{MOP}$) may be estimated and/or measured. In one example, a pressure sensor coupled to the mechanical oil pump may measure the pressure output of the pump. In another example, the pump pressure may be inferred from the engine speed (since the mechanical pump is coupled to and affected by engine speed) and/or engine torque. At 510, the output of the electric pump ($P_{EOP}$) may be adjusted such that $P_{EOP}=P_{DRAG}-P_{MOP}$. As previously elaborated with reference to routine 400 (FIG. 4), the output of the electric pump may be adjusted by corresponding adjustments in the flow level of oil from the pump, the power output of the pump, the power output of the electric motor driving the pump, or any combination thereof.

As the engine speed decreases upon application of the drag torque, the same may be communicated with the controller to accordingly adjust the pump output. In one example, the pump output may be affected by the rate of engine shut-down. Thus, when the drag torque mediated shut-down proceeds at a faster rate, the overall pump output may be decreased. In this way, damage to the pumps and the clutches may be averted. In another example, when the drag torque mediated shut-down proceeds at a slower rate, the overall pump output may be increased to enable the engine shut-down to be expedited.

In another example, the pump output may be adjusted responsive to an absolute value of the engine speed instead of a rate of fall of engine speed. Thus, at the beginning of a drag torque mediated shut-down, when the engine speed is above a first threshold, the pump output may be adjusted to a first higher value, and then later, when the engine speed is below the first threshold but above a second threshold, the pump output may be adjusted to a second lower value. In one example, at higher crankshaft speeds, increased torque may be required to produce a given drop in engine speed, while at lower crankshaft speeds, decreased torque may be required to produce a similar drop in engine speed. It will be appreciated that in the described cases, when the pump output is adjusted, a ratio of output from the mechanical and electric pumps may also be accordingly adjusted.

In this way, the pump pressure may be adjusted responsive to an engine speed in a feed-forward or a feed-back response method. By adjusting the pump pressure responsive to the engine speed, engine shut-down may be expedited and engine restart may proceed without the need for complex and costly starter systems.

Figure 6A:
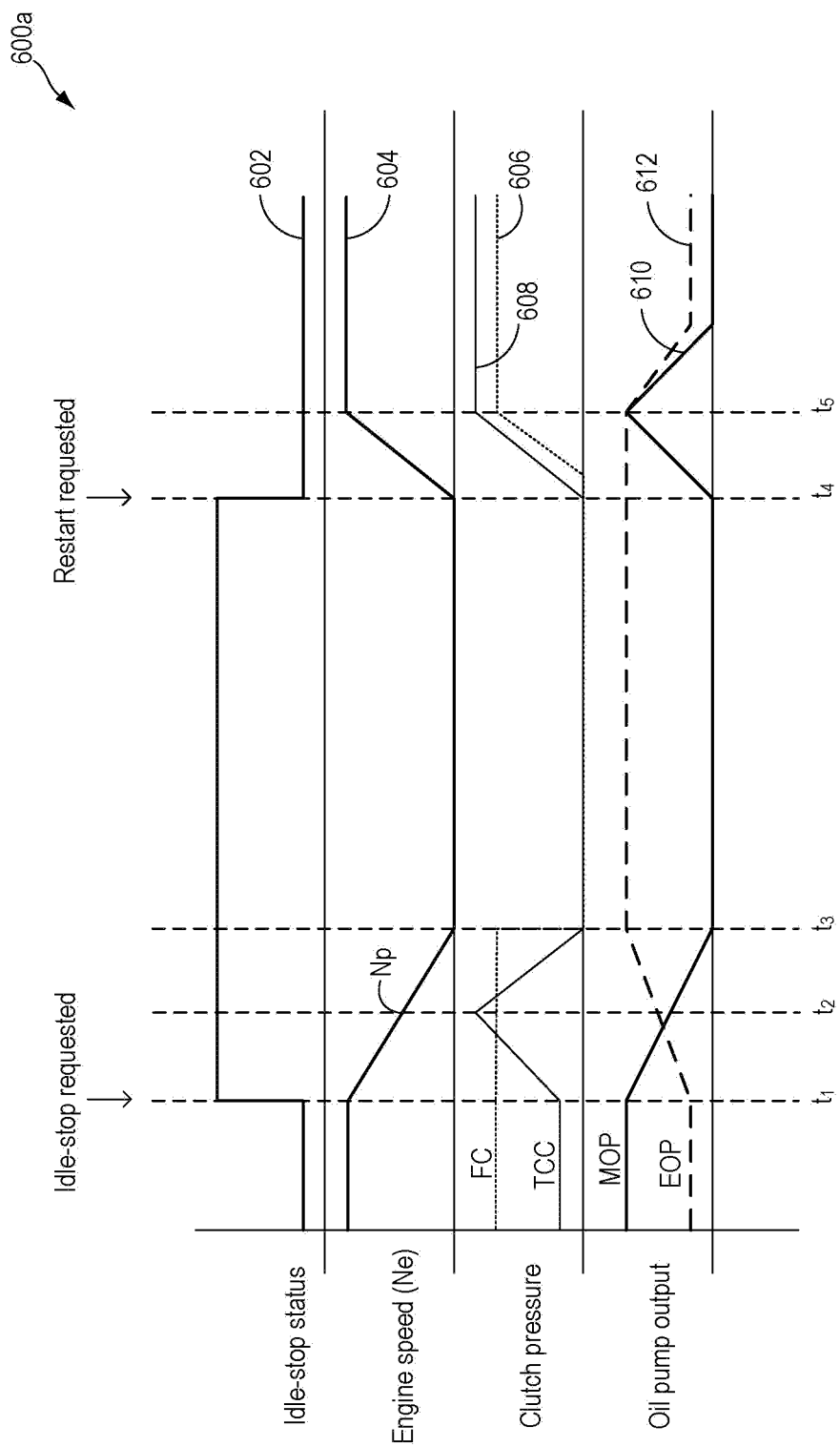
FIG. 6A-B show maps 600a-b with a plurality of graphs explaining example engine shut-down procedures in response to idle-stop conditions, according to the present disclosure.
Figure 6B:
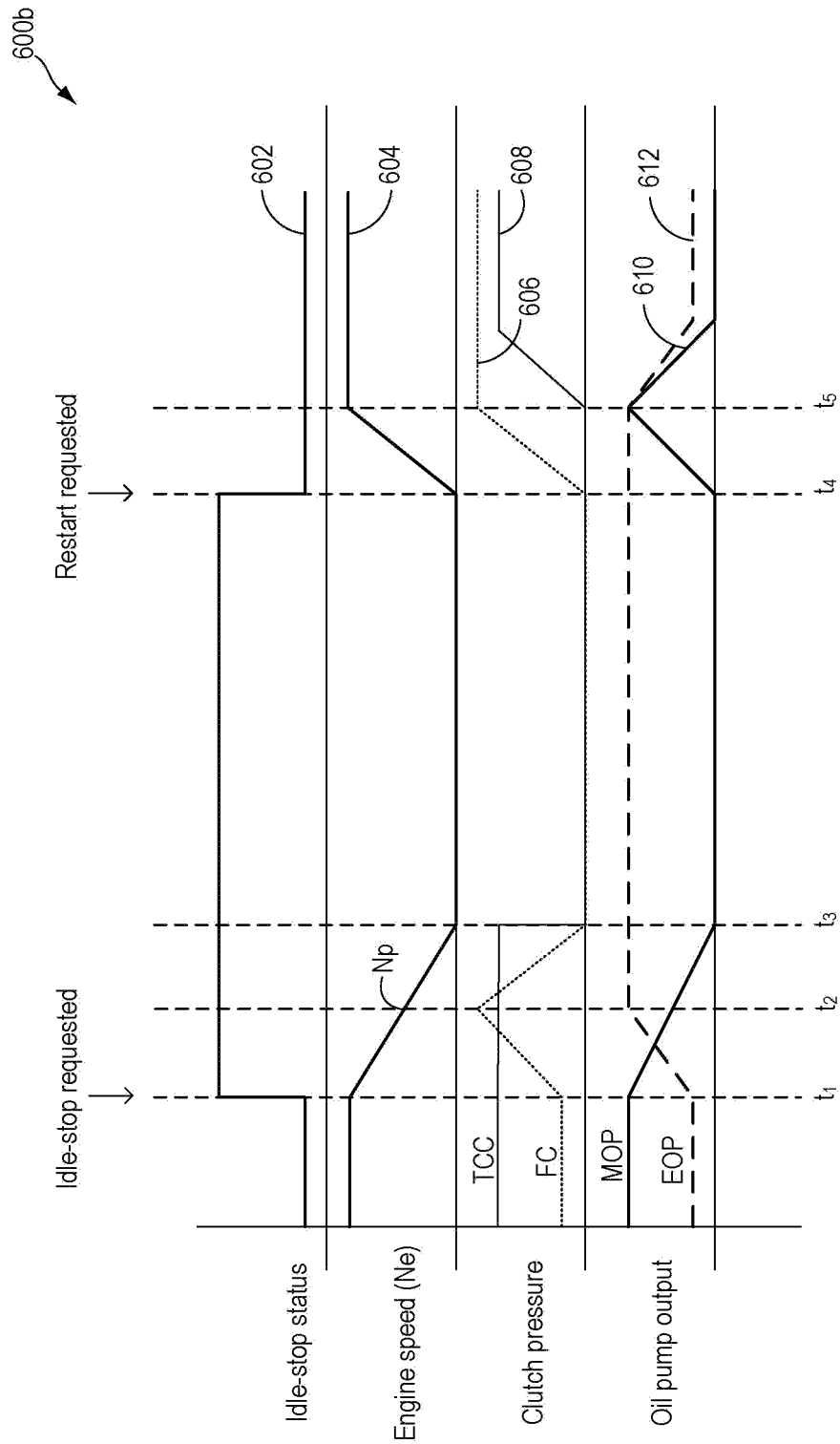

FIGS. 6A-B depict maps 600a-b with a plurality of graphs depicting example shutdown and restart scenarios for further explaining the expedited shut-down control of the present disclosure.

Both map 600a and 600b show an indication of idle-stop conditions in the first graph 602. The second graph 604 depicts the engine speed during the presence of idle-stop or restart conditions. Graphs 606 and 608 depict changes in clutch pressure for a forward clutch (FC) of the transmission and a torque converter lock-up clutch (TCC) respectively, during the idle-stop and subsequent restart operations. Finally, graphs 610 and 612 depict adjustments to the output capacity of a mechanical oil pump (MOP) and an electric oil pump (EOP) respectively, during the idle-stop operation.

Now turning to FIG. 6A and map 600a, at $t_1$, an idle-stop request may be confirmed (for example, by confirming idle-stop conditions) and an idle-stop operation may be initiated. As depicted, the idle-stop conditions may prevail until $t_4$. However, the majority of adjustments required to attain an engine shut-down upon confirmation of idle-stop conditions, may be performed between time points $t_1$ and $t_3$. In the same way, at $t_4$, idle-stop may be stopped due to confirmation of restart conditions. While restart conditions may prevail long after $t_4$, the majority of adjustments required to attain an engine restart upon confirmation of restart conditions, may be performed between time points $t_4$ and $t_5$.

As such, before idle-stop conditions are confirmed, that is before $t_1$, the engine speed may be at a high value (as shown in 602), a forward clutch (FC) may be engaged (at 606) and a torque converter lock-up clutch (TCC) may be partially engaged (as shown at 608) or alternatively may be disengaged. At $t_1$, when idle-stop conditions are confirmed, reduction of engine speed may be initiated to finally attain engine shut-down. As such, the engine speed may be brought to zero in a number of ways. However, in the depicted graph, engine spin down is illustrated with the help of an increase in transmission drag torque. Specifically, in the depicted example, a transmission drag torque is applied by maintaining a fixed engagement of the FC and modulating the engagement of the TCC. However, in alternate examples, the TCC may be fixed and the FC modulated (as shown in FIG. 6B), or both TCC and FC may be modulated.

Herein, to reduce the speed of the engine in an expedited manner, it may be desirable to attain zero engine speed by time $t_3$, but not afterwards. To do so, a forward clutch of the transmission (FC) may be maintained in a fixed state of engagement, as indicated by the lack of change in clutch pressure for FC in 606. In one example, FC may be maintained in a fixed gear position. Additionally, the engagement state of a heretofore partially engaged TCC may be modulated as shown in 608. Specifically, TCC may be gradually shifted to a fully-engaged state (by $t_2$) by increasing the hydraulic pressure supplied to the clutch. The clutch pressure may be gradually increased with a corresponding decrease in engine speed. The clutch pressure may be further adjusted responsive to the engine speed. In the depicted example, as the engine speed decreases (as shown in 604) but remains above a predetermined threshold Np, the clutch pressure may be increased to expedite engine shut-down (as shown between $t_1$ and $t_2$). As the engine speed falls below Np, the clutch pressure may be decreased (as shown between $t_2$ and $t_3$). Once engine shut-down is attained, the clutch pressure may be dropped and one or more of the clutches may be disengaged. For example, as depicted, the clutch pressure of TCC may remain at a dropped level until an engine restart is desired. The clutches may remain disengaged until restart conditions are met (for example at $t_4$) and an engine restart is requested. At that point (that is at $t_4$), the clutch pressure of one or more of the clutches may be rapidly increased to allow the engine speed to correspondingly increase and attain the desired speed. In this way, restart may be attained by $t_5$. Once restart has been established, the clutches may be maintained in an engaged state.

The hydraulic pressure used for engagement/disengagement of the modulated clutch may be adjusted by a controller by appropriately adjusting and coordinating the output of a mechanical oil pump (MOP) associated with the automatic transmission with the output of an independent electric oil pump (EOP) coupled to the engine. As such, the output of the mechanical oil pump may be affected by the engine output. Thus, as an engine speed decreases, the output of the mechanical pump may also decrease in a similar fashion. Thus at lower engine speeds, the output of the mechanical pump may not suffice for applying hydraulic pressure on the clutch to keep it engaged. Therefore, at lower speeds, the output of an electric oil pump may be used to supplement that of the mechanical oil pump. It thus follows that as the output of the mechanical oil pump falls mirroring the drop in engine speed, a concomitant increase in the output of the electrical oil pump may occur, enabling the clutch pressure to be adjusted to the desired value. Using the output of the two pumps, the engine speed may be brought to zero by $t_2$, following which, the output of both pumps may be reduced (to zero, or to a basal value). Following idle-stop, when restart is requested at $t_4$, the pump outputs may be increased rapidly to enable the clutch pressure to be increased and the clutch to be engaged rapidly, allowing the engine to be restarted and/or launched upon driver request. Once the clutch has been engaged, the clutch pressure may be reduced to a lower value, for example a hold value. Similarly, after engagement, the output of the pumps may be reduced and maintained at lower basal values.

Map 600b of FIG. 6B shows another example of attaining engine shut-down in response to idle-stop conditions being met and for a subsequent restart operation. Herein, engine shutdown is expedited by maintaining TCC in a fixed state of engagement, as indicated by the lack of change in clutch pressure for TCC in 608, while adjusting the clutch pressure for FC. In one example, TCC may be maintained in a fixed gear position. The engagement state of heretofore partially engaged FC may be modulated as shown in 606. Specifically, FC may be gradually shifted to a fully-engaged state (by $t_2$) by increasing the hydraulic pressure supplied to the clutch. Herein, clutch pressure may increase as the engine speed remains above predetermined threshold Np (as shown between $t_1$ and $t_2$), and then clutch pressure may be decrease as the engine speed goes below Np (as shown between $t_2$ and $t_3$). Following engine shutdown, both clutches may be shifted to a disengaged state, and may remain so until restart is requested and restart conditions are met at $t_4$. Following the restart request, TCC may be maintained in a disengaged state while only FC may be shifted to an engaged position (as shown in 606) to allow an initial engine restart and for the engine speed to be brought up. Once the engine has been restarted and the desired engine speed has been attained, TCC may be engaged. The output of the mechanical and electric oil pumps may mirror the variations in engine speed and clutch pressure, as shown at 610 and 612. It will be appreciated that both engine shutdown and restart operations may be conducted with at least one of the various clutches in a geared or engaged position, and not in a neutral configuration.

In this way, the output of the electric and mechanical pumps may be adjusted to allow an appropriate clutch engagement-disengagement maneuver to occur in response to idle-stop and/or restart conditions.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of controlling a vehicle system including an engine that is selectively shut-down during engine idle-stop conditions, comprising:
   during an idle-stop engine shut-down,
      adjusting, via a controller, responsive to engine speed relative to a threshold speed, a hydraulic actuation of a torque converter lock-up clutch to adjust drag torque on the engine to stop the engine, the hydraulic actuation of the torque converter lock-up clutch adjusted to provide an engine speed profile towards zero speed.

2. The method of claim 1, further comprising:
   determining a desired stopping position of the engine for the idle-stop engine shut-down, the engine brought to the desired stopping position by an end of the engine shutdown operation, the engine restarted from the desired stopping position to enable a faster restart during a subsequent restart operation; and
adjusting actuation of the lock-up clutch responsive to the desired stopping position of the engine.

3. The method of claim 2, wherein a transmission gear is engaged during the shut-down, and during a subsequent restart.

4. The method of claim 1, wherein a transmission gear is engaged during the shut-down, and during a subsequent restart.

5. The method of claim 1, further comprising actuating an electrically actuated hydraulic pump responsive to the shut-down.

6. The method of claim 5, further comprising adjusting actuation of the electrically actuated hydraulic pump responsive to operation of a mechanically actuated hydraulic pump.

7. The method of claim 5, further comprising adjusting actuation of the electrically actuated hydraulic pump responsive to engine speed below the threshold speed to increase a hydraulic pressure output by the hydraulic pump.

8. The method of claim 1, wherein adjusting the hydraulic actuation of the lock-up clutch adjusts a coupling between stopped wheels of the vehicle and the engine through the transmission.

9. The method of claim 8, wherein adjusting the hydraulic actuation of the torque converter lock-up clutch to adjust the drag torque on the engine includes adjusting the drag torque generated by the coupling responsive to the engine speed.

10. The method of claim 9, wherein the coupling is increased to increase the drag torque in response to engine speed being above a desired engine speed, and wherein the coupling is decreased to decrease the drag torque in response to engine speed being below the desired engine speed.

11. The method of claim 10, further comprising, increasing a degree of engagement of the torque converter lock-up clutch from a current degree of engagement to increase drag torque during the shut-down.

12. The method of claim 8, further comprising:
increasing a degree of engagement of a transmission forward clutch from a current degree of engagement to further couple wheels to the engine while wheel brakes are engaged.

13. The method of claim 11, further comprising:
reducing the engagement of the lock-up clutch from the increased degree of engagement after completing the shut-down; and
subsequently cranking the engine to restart the engine with the engagement of the lock-up clutch reduced, wherein to restart the engine, the engine is started without assistance from an auxiliary starter.

14. The method of claim 2, wherein the adjusting during the idle-stop engine shut-down includes:
increasing engagement of a transmission forward clutch and the torque converter lock-up clutch to stop the engine during the shut-down as a function of the desired stopping position and the engine speed relative to the threshold speed;
then decreasing engagement of the transmission forward clutch and the torque converter lock-up clutch; and
after the idle-stop engine shut-down, increasing engagement of at least the transmission forward clutch during a subsequent engine start to launch the vehicle system.

15. A vehicle system, comprising:
a powertrain including wheels, an engine, a torque converter having a lock-up clutch, and an automatic transmission including a forward clutch;
wheel brakes; and
a control system configured with computer readable instructions stored in non-transitory memory that when executed cause a controller to selectively shut-down the engine during engine idle-stop conditions without receiving a shut-down request by an operator, where to stop the engine for the shut-down, the control system increases engagement of at least the lock-up clutch and the forward clutch, responsive to engine speed below a threshold speed, to further couple the wheels to the engine while the wheel brakes are engaged, and where to restart the engine, the engine is started without assistance from an auxiliary starter.

* * * * *